United States Patent [19]

Brych

[11] Patent Number: 4,622,256

[45] Date of Patent: Nov. 11, 1986

[54] ACCOUNTING CARD

[76] Inventor: Heinz Brych, Caspar Olevianstrasse, 5500 Trier, Fed. Rep. of Germany

[21] Appl. No.: 335,858

[22] Filed: Dec. 30, 1981

[51] Int. Cl.⁴ ................................................ B32B 3/10
[52] U.S. Cl. .................................. 428/131; 283/60 R; 283/60 A; 283/66 R; 283/55
[58] Field of Search ................ 40/2 R, 616, 107, 110; 283/60 R, 60 A, 55, 66 R, 63 A, 12 A, 19; 428/131

[56] References Cited

U.S. PATENT DOCUMENTS

| | | | |
|---|---|---|---|
| 3,457,661 | 7/1969 | Peters | 428/916 X |
| 3,892,901 | 7/1975 | Smith | 40/2 R X |
| 3,950,870 | 4/1976 | Heegard | 40/2 R |
| 4,317,852 | 3/1982 | Ogden | 428/40 |

Primary Examiner—Alexander S. Thomas

[57] ABSTRACT

A small card to be punched for accounting purposes has approximately the dimensions of a cheque card and is made of a plastics material that may be creased. Positioning holes defining a punching box are provided at regular intervals in lines and columns parallel to the longitudinal edges and the transverse edges of the card. Outside the punching boxes, clocking holes are provided punched parallel to a longitudinal edge. The card is used in combination with specially adapted pliers thereby facilitating the accounting of items purchased by or served to a customer.

5 Claims, 8 Drawing Figures

ACCOUNTING CARD

The invention relates to a small card to be punched for accounting purposes.

BACKGROUND OF THE INVENTION

In the restaurant business, correct accounting is a big problem. On the one hand, a wide variety of prices is involved. On the other hand, different things are ordered at widely different times. Furthermore, the correct amount has to be added up for the correct person. In most cases, payment is not made in the exact amount that corresponds to the bill but payment is made in a larger amount, and this then results in the return of money.

Frequently, the establishments have to work with staff who are not trained at all and come from different origins. In isolated cases, there is also staff who line their own pockets. In dealings close to frontiers with two currencies, it is difficult to distinguish between the currencies. More especially the coins of different currencies are sometimes very similar in appearance. For the customer, it is a nuisance having to get out his purse frequently. Often, the illumination is also unfavourable for writing and reading, for example in discotheques. Many customers get angry because they have to wait too long for the paying process to take place. Even if everything has taken place properly, the staff and those who are in charge of the accounting sit together until the early hours of the morning in order to do the accounting. The total turnover of the day and the individual turnover of each waiter or waitress is not known long after the premises have been shut. Also, there frequently arise difficulties with the tax collector who is prone to suspect manipulations in these establishments, so that the position vis-a-vis this authority is also difficult.

OBJECT AND STATEMENT OF THE INVENTION

It is the object of the invention to indicate a small card which is suitable for a system, the pliers of which system are claimed in a parallel application, this small card rendering possible (together with the pliers) a method of accounting which is so simple that life is made very considerably easier for both the customers and the serving staff and the supervisors.

According to the invention there is provided a small card to be punched for the accounting purposes, characterised by the following features: the small card has approximately the dimensions of a cheque card; the small card consists of a plastics material that may be creased; positioning holes are provided at regular intervals in lines and columns parallel to the longitudinal edges and the transverse edges of the small card; two positioning holes define a punching box; and outside the punching boxes, clocking holes have been punched parallel to a longitudinal edge.

The dimensions of the small card allow it to be kept conveniently, for example in a purse, a shirt pocket, placed under the strap of a watch, or even in a shoe.

Since the small card consists of a plastics material which may be crumpled, there is no need to take special care thereof, in contrast, for example, to a parking ticket taken from a parking meter. This property is important because it has to be possible for the small card to be later read in a reader, and this even if it has been previously crumpled or has drink stains. Due to the positioning holes, it is necessary that punching is exclusively effected at regular points in positions intended by the designer and there is thus no need for the serving person to take special aim with the pliers. Due to the two positioning holes, an exact alignment of punchings is obtained. If, by contrast, only one positioning hole were provided, the serving person would have to aim angularly with the pliers. Due to the pre-punched clocking holes, the small card becomes easily readable and the pliers can be simpler in design, so that they do not have to punch the clocking holes.

Two positioning holes provided along the longitudinal edge define a punching box. Due to this feature, it is ensured that the pliers can be kept considerably shorter on the punching side than would be possible if the positioning holes were provided along a transverse edge, which would also necessitate a transverse introduction of the small card into the reader.

The positioning holes define the corners of a punching box. This feature ensures that the positioning holes have a maximum spacing and that the positioning of the pliers thus also become optimal. Furthermore, the number of the positioning holes then also become minimal, and this prevents the small card from being unnecessarily weakened.

The clocking holes are considerably smaller than the positioning holes. Due to this feature, the small card is prevented from being weakened too much along the lines of of an undesired "predetermined breaking point", on the one hand, and, on the other hand, clocking holes are prevented from being erroneously used as positioning holes.

In the continuation of the columns of the positioning holes the positioning holes have a larger spacing than in the interspaces. Due to this feature, the positioning holes are in a simple manner prevented from being read as punched holes.

Three clocking holes are provided for each box or column. This feature makes it possible to associate with the three clocking holes a group of punched holes which also has three juxtaposed holes. It is then readily possible to provide on a cheque card 80 boxes without weakening the card too much or exacting from the serving person skill requirements which are too high.

DESCRIPTION OF THE DRAWINGS

The invention will now be described with the aid of a preferred exemplified embodiment. In the drawings.

DETAILED DESCRIPTION

Figure 1:
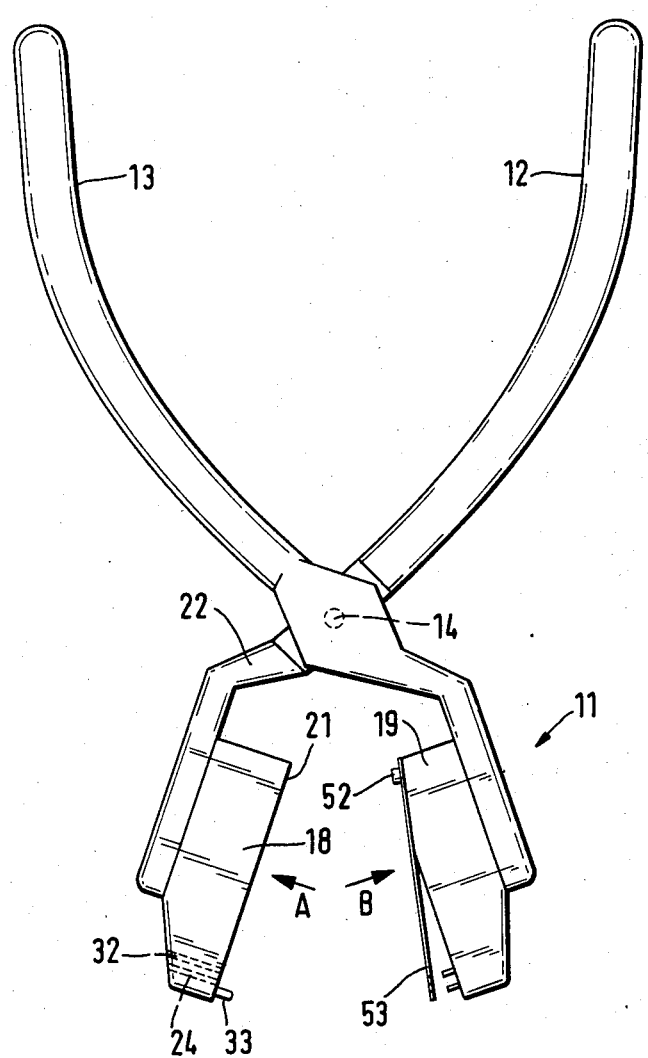
FIG. 1 shows a top view of a pair of pliers.

A pair of pliers 11 has a first double-arm lever 12 and a second double-arm lever 13. They are connected in a central zone by a pivot so as to be pivotable relative to each other in the usual way, so that the levers 12, 13 can pivot about a geometrical transverse axis 14 which in FIG. 1 is vertical to the drawing plane. Large shoes 18 and 19, which are made of metal and have a shape that is similar to a brake shoe, are screwed with the aid of screws 16 to the ends of the levers 12 and 13 respectively.

The shoe 18 has on its inside a plane 21 which is not only parallel to the transverse axis 14 but passes through this axis, which is possible because of the crank 22. Inside a coding box 23, which is shown in dash-dotted lines, there are provided through bores 24, 26, 28, 29, 31, 32 which form punch holes and are circular-cylindrical. The through bores 24, 26, 28 are located parallel to the transverse axis 14, and the through bores 29, 31, 32 are also parallel to the latter and to these bores, so that there is formed a 2×3 arrangement which has its larger extension parallel to the transverse axis 14.

Figure 2:
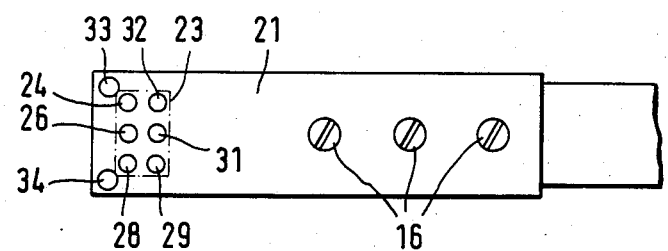
FIG. 2 shows a view thereof in the direction of the arrow A in FIG. 1, shown enlarged twice its normal size relative to the size of the pliers shown in FIG. 1.
Figure 3:
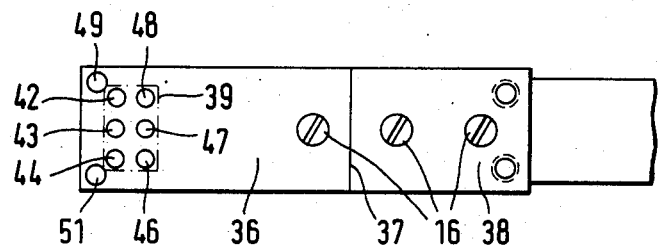
FIG. 3 shows a view according to the arrow B in FIG. 1, shown enlarged twice its normal size relative to the size of the pliers shown in FIG. 1, but without the leaf spring.
Figure 4:
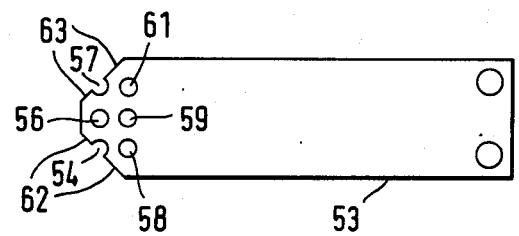
FIG. 4 shows a view, according to the arrow B in FIG. 1, of the leaf spring by itself shown enlarged twice its normal size relative to the size of the pliers shown in FIG. 1.

The through bores thus formed always are at the same distance from their neighbour. As shown in FIG. 2, there are provided to the left of the coding box 23, closely adjacent thereto, two vertically projecting positioning pins 33, 34 which sit in the left-hand corner zones of the plane 21. Their diameter is about 1.47 mm. The diameter of the through bores 24 etc. is about 1.3 mm.

Figure 5:
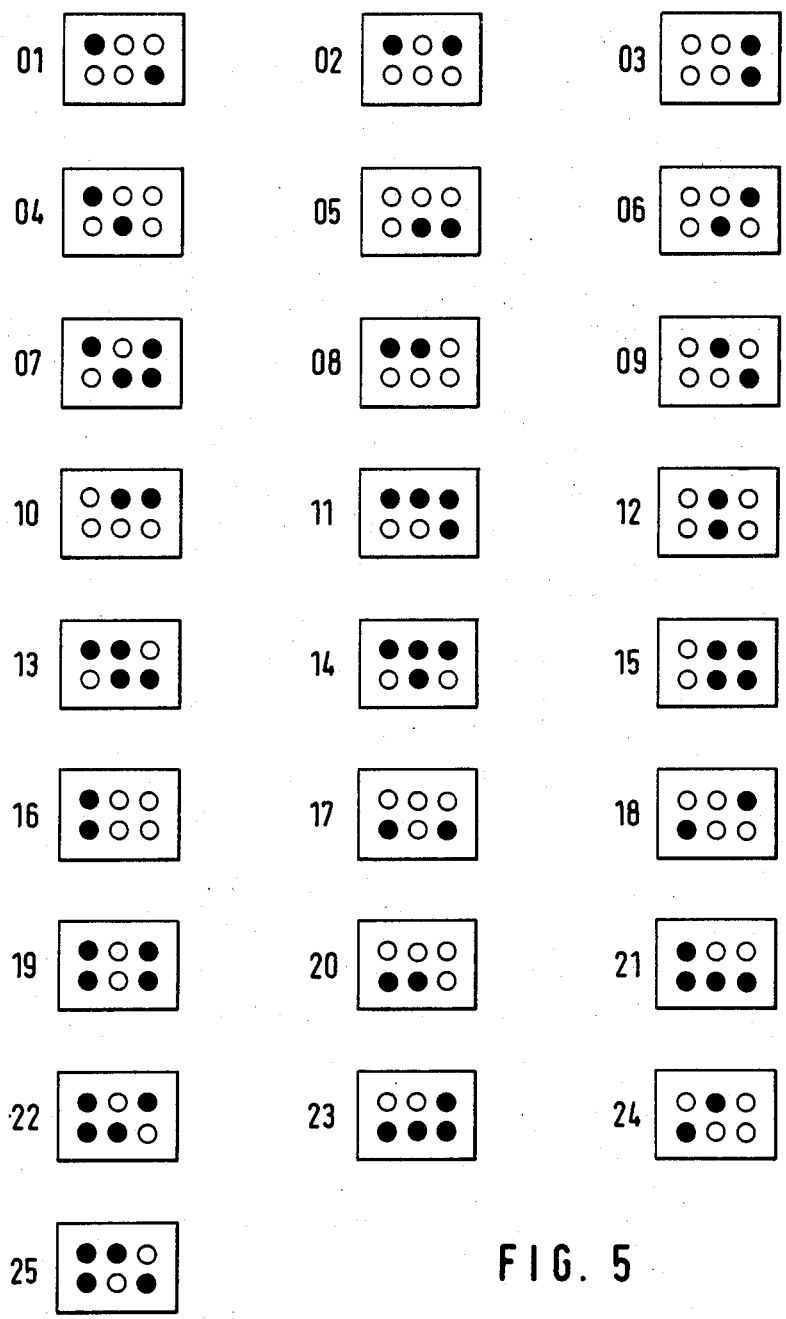
FIG. 5 shows a number of possible arrangements on the punched holes but also of the holes which have to be punched into a small card in the event of 25 serving persons being involved.

The other shoe 19 has a plane 36 which also passes through the transverse axis 14 and which, after a bend 37, merges in a plane 38 which is at an acute angle of approximately 15° thereto. On the left-hand side, the plane 36 has again a coding box 39 that corresponds to the coding box 23, which boxes lie one upon the other in coincidence when the pliers 11 are closed. In accordance with the arrangement of the through bores 24 etc., there are provided in the coding box 39 punching pin positions 41, 42, 43, 44, 46, 47, 48. These are "positions" because, as shown in FIG. 5, there is no need to provide all of the punching pins. By contrast, one can provide the through bores 24 etc. for reasons of rationalisation, since these are inactive without the punching pins.

Corresponding to the positioning pins 33, 34, there are provided to the left of the coding box 39 through bores 51, 49, into which the positioning pins 33, 34 begin to plunge when the pliers 11 have not yet been completely closed.

In the plane 38, there is fastened by means of screws 52 a thin flat leaf spring 53 which is exactly as wide as the shoe 19 is high. In the opened state, and when the leaf spring 53 is untensioned, its external end projects considerably from any existing punching pins. When the pliers 11 are closed, the plane 21, with its external zone, presses the leaf spring 53 against the plane 36. During this process, the existing punching pins traverse the through bores 54, 56, 57, 58, 59, 61 which are arranged in the same way as the through bores 24 etc. and lie above these in coincidence but whose diameter is considerably larger than the outside diameter of any existing punching pins. Furthermore, the through bores 54, 57 are cut by chamfers 62, 63. Therefore, no through bores are provided for the positioning pins 33, 34.

FIG. 5 shows which punching pin positions are occupied if 25 serving persons are involved. It is obvious that the punching pin positions are already prepared in so far as the bores for the punching pins may already be provided. Punching pins are then inserted into these holes, which are also preferably through bores, at specific points only.

For the serving person 01, the punching pin position 48 has a punching pin, which signifies "01". The punching pin position 44 is also occupied, so as to allow a parity check to be made.

For the serving person 02, one has a pair of pliers whose punching pin position 42 is occupied, which signifies 2. Furthermore, the punching pin position 44 is occupied, which again serves for the parity check. The serving person 03 has a pair of pliers whose punching pin position 48 is occupied, which signifies "1" as previously. The punching pin position 42 is "2", as previously, which comes to 3 in all. A parity check is then obtained in any event because of the two holes which later exist in the small card.

The serving person 04 has a pair of pliers whose punching pin position 47 is occupied, which signifies "4", and the occupied punching pin position 44 again serves for the parity check.

The serving person 05 has a pair of pliers whose punching pin positions 48 (=1) and 47 (=4) are occupied, which makes a total of 5. In the case of the serving person 06, the pair of pliers has the positions 42 and 47 occupied, which comes to 2+4=6 and does not necessitate any parity check.

In the case of the serving person 07, the punching pin positions 42, 48 and 47 are occupied, which comes to 2+1+4=7, and the punching pin position 44 is again occupied for parity check reasons. The serving person 08 has a pair of pliers whose punching pin positions 43 and 44 are occupied, the punching pin position 43 signifying "8" and 44 being again relevant for the parity check.

In the case of the serving person 09, the punching pin positions 48 (=1) and 43 (=8) are occupied, which comes to a total of "9". In the case of the serving person 10, the punching pin positions 42, 43 are occupied, which comes to 8+2=10; etc.

Even if 25 serving persons are involved, there is provided a maximum of four punching pins, which hardly weakens the small cards. The arrangement is such that if the small cards consist, for example, of the material Syntape made by the American Tobacco company, the cards may be crumpled up and nevertheless remain processable.

A small card 64 is 87 mm long and 55 mm high and consists of the mentioned material Syntape. Its size is thus approximately that of a cheque card. The upper edge and the lower edge are parallel to each other, and so are the right-hand and left-hand edges, and these groups are vertical to one another. At a centre distance of 3.75 mm from the upper edge, there are provided the clocking holes, all of which lie in a straight line 66 which is parallel to the upper edge. Their diameter is 1.3 mm. The top left-hand clocking hole 67 is at a distance of 2.5 mm from the left-hand edge. There follows a clocking hole 67 at a distance of 3 mm. The distance between the following clocking holes 68, 69 is 2.5 mm.

There follows again a clocking hole 71 at a distance of 3 mm. Altogether, there are provided ten of such groups of three holes, which have the 2.5 mm spacing between the holes of one group and the 3 mm spacing between the groups.

Figure 6:
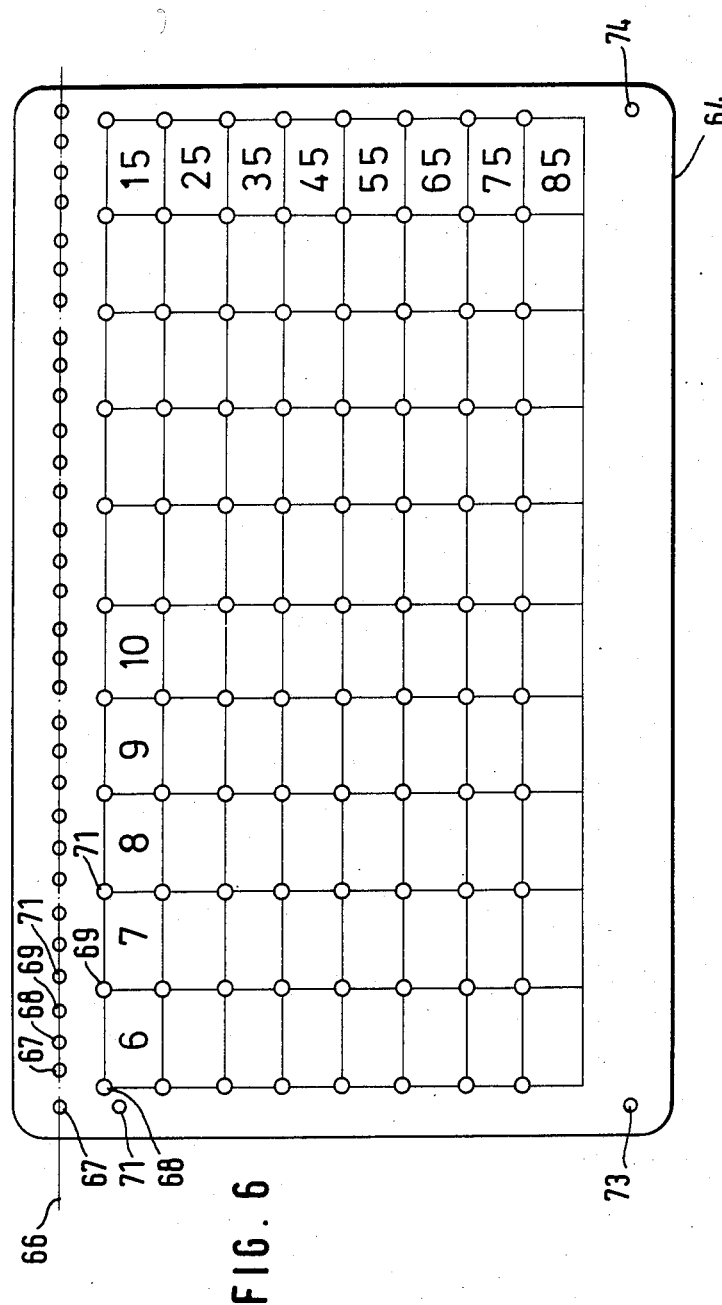
FIG. 6 shows a top view of an accounting card shown enlarged twice its normal size relative to the size of the pliers shown in FIG. 1.

Beneath the 3 mm spacing and centrally thereto, there are provided eight positioning perforations 68 which are at equal centre spacings of 5 mm from one another. Their diameter is 1.5 mm. To the right of the positioning hole 68, there is provided a positioning hole 69 at a distance of 8 mm. Therebeneath, there is printed a box in which the number "6" is shown. To the right of the positioning hole 69, there is provided a positioning hole 71 at a distance of 8 mm beneath the 3 mm spacing, and beneath this hole there are seven more positioning holes of identical configuration. In this way, there is formed a grid for positioning holes, as shown in FIG. 6, into which holes the positioning pins 33, 34 can be introduced. Since the first box has the number "6", the number "85" has been printed into the last box on the bottom right-hand side.

FIG. 6 shows an accounting card because this card starts with 6. The customer has thus already had a deduction of five units (e.g. DM) for admission. The respective serving person introduces into the boxes 6, 7, 8 etc. the punchings shown in FIG. 5. If the customer now uses four units, then the serving person punches one of the codes of FIG. 5. If the visitor thereafter uses up six units, then the box 15 is punched, etc.

Figure 7:
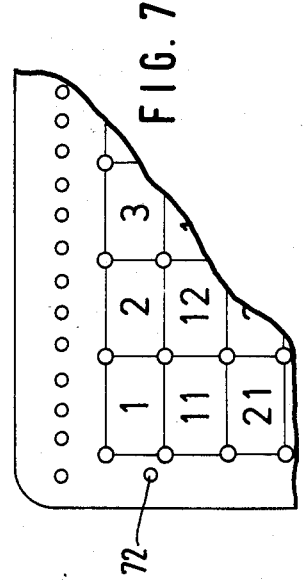
FIG. 7 shows a top view of the left-hand upper zone of an additional card shown enlarged twice its normal size relative to the size of the pliers shown in FIG. 1.

Beneath the clocking hole 67, close to the positioning perforation 68, there has been punched at the outset an identification hole 71 which tells a human or mechanical reader that this is an accounting card. In the case of FIG. 7, this identification hole 72, whose diameter is the same as that of the clocking holes and the punched holes, is provided close to a positioning hole which is provided at a somewhat lower point. The human or mechanical reader learns therefrom that this is an additional card, whose top left-hand box starts with 1 and is numbered consecutively 2, 3 etc. Such a card is used if the 85 units of the accounting card are not sufficient.

Both the accounting card shown in FIG. 6 and the additional card shown in FIG. 7 have at the bottom left-hand and right-hand sides holes 73, 74 which are located vertically beneath the first and last clocking holes respectively and tell a mechanical reader that reading either starts or is finished.

Figure 8:
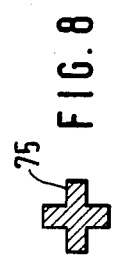
FIG. 8 shows the cross section of a punching pin having a specific circumferential configuration.

It is possible to effect other punchings than those shown in FIG. 5. FIG. 8 shows the cross section of a cruciform punching pin. Here, the association with the serving person resides in the shape of the punching pin. Of course, the punched hole is then formed accordingly.

I claim:

1. A small card to be punched for accounting purposes comprising:
    a hand held card having longitudinal edges and transverse edges and having approximately the dimensions of a cheque card;
    said hand held card consisting of a plastic material that may be creased;
    a first plurality of holes in said hand held card comprising pairs of positioning holes at regular intervals in lines and columns parallel to said longitudinal edges and transverse edges;
    each of said pairs of positioning holes locating a punching box; and
    a second plurality of holes in said hand held card comprising clocking holes arranged in a line between said first plurality of holes and one of said longitudinal edges of said hand held card, parallel to said longitudinal edge;
    wherein directly above said column of positioning holes the spacing between said clocking holes is larger than the spacing between other clocking holes.

2. A small card as claimed in claim 1, wherein two positioning holes provided along said longitudinal edge locate a punching box.

3. A small card as claimed in one of claims 1 or 2, wherein said positioning holes locate the corners of a punching box.

4. A small card as claimed in claim 1, wherein said clocking holes are considerably smaller than said positioning holes.

5. A small card as claimed in claim 1, wherein three clocking holes are provided for each box or column.

* * * * *